US011178122B2

(12) United States Patent
Hwang et al.

(10) Patent No.: US 11,178,122 B2
(45) Date of Patent: Nov. 16, 2021

(54) DATA ENCRYPTION AND DECRYPTION METHOD AND SYSTEM

(71) Applicant: I.X Co., Ltd., Taipei (TW)

(72) Inventors: Gwan-Hwan Hwang, Hsinchu County (TW); Shih-Wei Wang, Taipei (TW); Tsu-Chin Wu, Taipei (TW)

(73) Assignee: I.X Co., Ltd., Taipei (TW)

( * ) Notice: Subject to any disclaimer, the term of this patent is extended or adjusted under 35 U.S.C. 154(b) by 278 days.

(21) Appl. No.: 16/329,119

(22) PCT Filed: Aug. 31, 2016

(86) PCT No.: PCT/CN2016/097550
§ 371 (c)(1),
(2) Date: Feb. 27, 2019

(87) PCT Pub. No.: WO2018/039979
PCT Pub. Date: Mar. 8, 2018

(65) Prior Publication Data
US 2019/0207913 A1 Jul. 4, 2019

(51) Int. Cl.
*H04L 29/06* (2006.01)
*H04L 9/08* (2006.01)
*H04L 9/14* (2006.01)
*H04L 9/30* (2006.01)

(52) U.S. Cl.
CPC .......... *H04L 63/045* (2013.01); *H04L 9/0819* (2013.01); *H04L 9/0869* (2013.01); *H04L 9/14* (2013.01); *H04L 9/30* (2013.01); *H04L 63/0435* (2013.01)

(58) Field of Classification Search
CPC .................................................. H04L 63/045
See application file for complete search history.

(56) References Cited

U.S. PATENT DOCUMENTS

| 5,907,621 A * | 5/1999 | Bachman | H04L 63/0807 713/155 |
| 10,003,466 B1 * | 6/2018 | Miller | H04L 9/3247 |
| 2002/0049818 A1 * | 4/2002 | Gilhuly | H04W 12/04 709/206 |
| 2002/0052965 A1 * | 5/2002 | Dowling | G06Q 20/3224 709/230 |
| 2008/0084578 A1 * | 4/2008 | Walker | G06F 3/1222 358/1.15 |
| 2013/0039360 A1 * | 2/2013 | Manian | H04L 67/10 370/352 |

* cited by examiner

*Primary Examiner* — Bradley W Holder

(57) ABSTRACT

A data encryption and decryption method is provided. The method is used in a data encryption and decryption system and includes: establishing, by a data encryption and decryption device, a first secure sockets layer (SSL) connection with a mobile device; receiving a data transmitted from the mobile device; generating a first symmetric key, encrypting the data using the first symmetric key, and generating first encrypted data; encrypting the first symmetric key using a first public key, and generating a first encrypted key; and transmitting the first encrypted data and the first encrypted key to the mobile device.

30 Claims, 13 Drawing Sheets

DATA ENCRYPTION AND DECRYPTION METHOD AND SYSTEM

BACKGROUND OF THE INVENTION

Field of the Invention

The invention relates to a data encryption and decryption method and system. More specifically, the present invention relates to a data encryption and decryption method and system which are used to protect the data of a mobile device.

Description of the Related Art

With the rapid development of networks, more and more data is being transmitted via a network, and accordingly network information theft has increased rapidly.

However, using software encryption programs will expose the allocated keys when they are processed. Unauthorized persons, virus programs, spy programs etc., may use these exposed keys to decrypt stored data.

Therefore, there is a need for a data encryption and decryption method and system that can preserve the keys and perform data encryption or decryption through hardware to ensure that confidential data will not be disclosed.

BRIEF SUMMARY OF THE INVENTION

A data encryption and decryption method and system are provided.

In a preferred embodiment, the invention is directed to a data encryption and decryption method. The method is used in a data encryption and decryption system and comprises: establishing, by a data encryption and decryption device, a first secure sockets layer (SSL) connection with a mobile device; receiving data transmitted from the mobile device; generating a first symmetric key, encrypting the data using the first symmetric key, and generating first encrypted data; encrypting the first symmetric key using a first public key, and generating a first encrypted key; and transmitting the first encrypted data and the first encrypted key to the mobile device.

In some embodiments, after the mobile device receives the first encrypted data and the first encrypted key, the mobile device uploads the first encrypted data and the first encrypted key to a cloud device. In some embodiments, the method further comprises: receiving, by the data encryption and decryption device, the first encrypted data and the first encrypted key transmitted from the mobile device; decrypting the first encrypted key using a first private key to obtain the first symmetric key; decrypting the first encrypted data using the first symmetric key to obtain the data; and transmitting the data to the mobile device. In some embodiments, before decrypting the first symmetric key using the first private key, the method further comprises: performing, by the data encryption and decryption device, an authentication process, wherein the authentication process is a fingerprint authentication process. In some embodiments, the data encryption and decryption device establishes the first SSL connection with the mobile device through Bluetooth transmission. In some embodiments, before establishing the first SSL connection with the mobile device, the method further comprising: performing a device matching process, wherein the device matching process comprises: installing, by the data encryption and decryption device, a second public key generated by a key storage device in advance; generating the first public key and the first private key; using the second public key to encrypt the first private key, and generating a second encrypted key; and transmitting the second encrypted key and an international mobile equipment identity (IMEI) corresponding to the data encryption and decryption device to a cloud device, and storing the second encrypted key and the IMEI into the cloud device; the cloud device transmits the second encrypted key and the IMEI to the key storage device. In some embodiments, the device matching process further comprises: establishing, by the cloud device, a second SSL connection with the mobile device; receiving, by the cloud device, a phone number and an e-mail address transmitted from the mobile device, and returning an acknowledgement e-mail to the mobile device, wherein the acknowledgement e-mail comprises an uniform resource locator (URL); generating, by the cloud device, and storing an account ID and a first key pair corresponding to the mobile device when the URL is clicked via the mobile device, wherein the first key pair comprises an account public key and an account private key; and transmitting the account ID and the account private key to the mobile device through the second SSL connection. In some embodiments, the device matching process further comprises: generating, by the data encryption and decryption device, a second symmetric key, and transmitting the second symmetric key to the mobile device through Bluetooth pairing; encrypting the IMEI using the second symmetric key, and generating an encrypted identifier; and transmitting the encrypted identifier to the mobile device. In some embodiments, the device matching process further comprises: receiving, by the cloud device, the IMEI and the phone number transmitted from the mobile device; generating a first random number; encrypting the first random number using the first public key, and generating a first encrypted random number; transmitting a short message service (SMS) to the data encryption and decryption device, wherein the SMS comprises the first encrypted random number; and transmitting the first encrypted random number and the first public key to the mobile device through the second SSL connection. In some embodiments, the device matching process further comprises: receiving, by the data encryption and decryption device, a second encrypted random number, a third encrypted key, a fourth encrypted key and a fifth encrypted account ID, wherein the mobile device generates a second key pair; the second encrypted random number is generated by encrypting the second random number using the first public key; the third encrypted key is generated by encrypting a third public key of the second key pair using the first public key; the fourth encrypted key is generated by encrypting the account private key using the first public key; and the fifth encrypted account ID is generated by encrypting the account ID by the first public key. In some embodiments, the device matching process further comprises: decrypting, by the data encryption and decryption device, the second encrypted random number, the third encrypted key, the fourth encrypted key and the fifth encrypted account ID using a first private key and obtaining the second random number, the third public key, the account private key and the account ID; and comparing the second random number with the first random number, wherein when the second random number and the first random number are the same, the data encryption and decryption device stores the third public key, the account private key and the account ID, and transmits an acknowledgement message to the cloud device and the mobile device, and the matching process is completed. In some embodiments, the method further comprises: generating, by a second data encryption and decryption device, a fourth public key and a second private key, and uploading the fourth public key and a second IMEI corresponding to the second data encryption and decryption device to the cloud device; receiving, by the cloud device, a key-transferring request from the mobile device; transmitting, by the cloud device, a key transferring notification to the data encryption and decryption device; downloading, by the data encryption and decryption device, the fourth public key from the cloud device after receiving the key transferring notification; encrypting, by the data encryption and decryption device, the first private key using the fourth public key, generating a sixth encrypted key, and transmitting the sixth encrypted key to the cloud device; transmitting, by the cloud device, the first public key and the sixth encrypted key to the second data encryption and decryption device; decrypting, by the second data encryption and decryption device, the sixth encrypted key using the second private key to obtain the first private key, replacing the fourth public key and the second private key with the first public key and the first private key; and transmitting, by the second data encryption and decryption device, a transfer completion acknowledgement to the cloud device. In some embodiments, the method further comprises: binding, by the cloud device, the first public key into the second IMEI corresponding to the second data encryption and decryption device after receiving the transfer completion acknowledgement. In some embodiments, the method further comprises: generating, by a second data encryption and decryption device, a fourth public key and a second private key, and uploading the fourth public key and a second IMEI corresponding to the second data encryption and decryption device to the cloud device; receiving, by the cloud device, a key-recovering request from the mobile device; transmitting, by the cloud device, a key-recovering notification to the second data encryption and decryption device; downloading, by the second data encryption and decryption device, the first public key from the cloud device after receiving the key-recovering notification; receiving, by the second data encryption and decryption device, a sixth encrypted key transmitted from the key storage device, and decrypting the sixth encrypted key using the second private key to obtain the first private key; replacing, by the second data encryption and decryption device, the fourth public key and the second private key with the first public key and the first private key; and transmitting, by the second data encryption and decryption device, a key-recovering completion acknowledgement to the cloud device. In some embodiments, the method further comprises: binding, by the cloud device, the first public key into the second IMEI after receiving the key-recovering completion acknowledgement. In some embodiments, after the second data encryption and decryption device uploads the fourth public key and the second IMEI to the cloud device, the method further comprises: transmitting, by the cloud device, the fourth public key to the key storage device; and decrypting, by the key storage device, the second encrypted key using a third private key to obtain the first private key, and encrypting the first private key using the fourth public key to generate the sixth encrypted key.

In a preferred embodiment, the invention is directed to a data encryption and decryption system. The system comprises a cloud device and a data encryption and decryption device. The data encryption and decryption device is coupled to the cloud device and used to: establish a first secure sockets layer (SSL) connection with a mobile device; receive data transmitted from the mobile device; generate a first symmetric key, encrypt the data using the first symmetric key, and generate first encrypted data; encrypt the first symmetric key using a first public key, and generate a first encrypted key; and transmit the first encrypted data and the first encrypted key to the mobile device.

BRIEF DESCRIPTION OF DRAWINGS

The accompanying drawings are included to provide a further understanding of the invention, and are incorporated in and constitute a part of the present invention. The drawings illustrate implementations of the invention and, together with the description, serve to explain the principles of the invention. It is appreciable that the drawings are not necessarily in scale as some components may be shown to be out of proportion than the size in actual implementation in order to clearly illustrate the concept of the present invention.

DETAILED DESCRIPTION OF THE INVENTION

Figure 1:
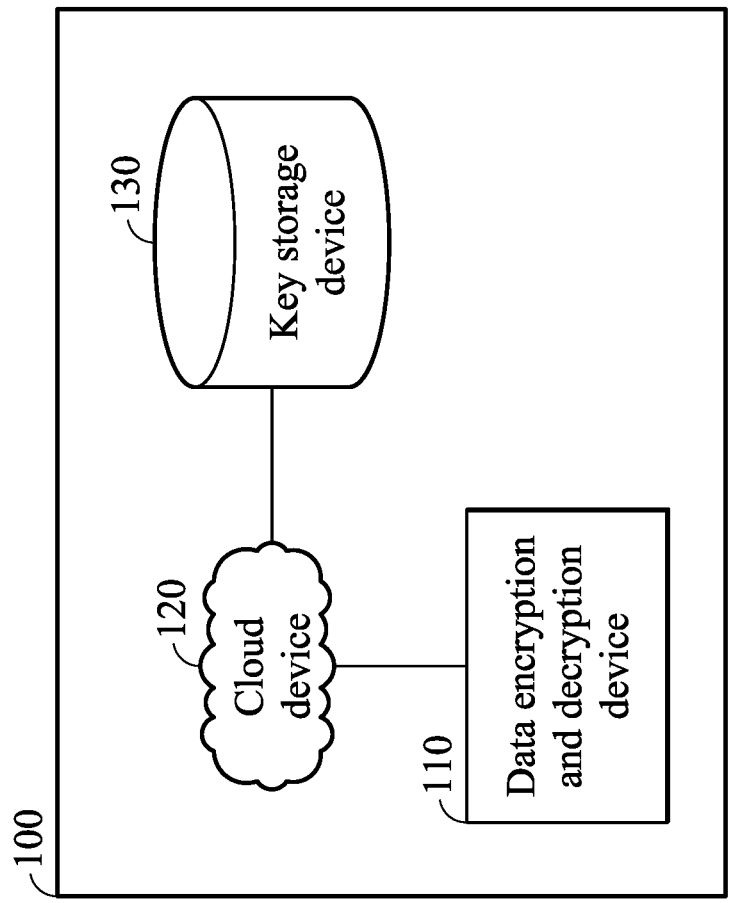
FIG. 1 shows a schematic diagram illustrating a data encryption and decryption system in accordance with one embodiment of the invention.
Figure 1:
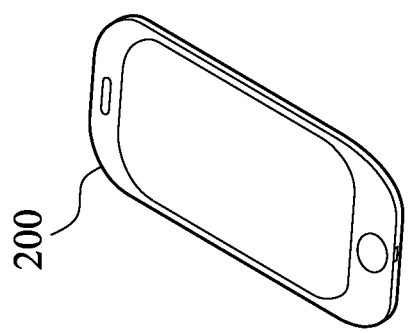

Several exemplary embodiments of the present disclosure are described with reference to FIGS. 1 through 9 which generally relate to a data encryption and decryption method and system. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 shows a schematic diagram illustrating a data encryption and decryption system 100 in accordance with one embodiment of the invention. The data encryption and decryption system 100 includes a data encryption and decryption device 110, a cloud device 120, and a key storage device 130, wherein the cloud device 120 can be connected to the data encryption and decryption device 110 and the key storage device 130 through a wireless network protocol link to perform data transmission with the data encryption and decryption device 110 and the key storage device 130. In one embodiment, the key storage device 130 may be included in the cloud device 120, or may also be present independently. The key storage system 130 is used to store private keys. It should be noted that the cloud device 120 and the key storage device 130 may be connected via a fixed telecommunication network.

The data encryption and decryption device 110 and the cloud device 120 may further perform data transmission with a mobile device 200 through a wireless network protocol link. The mobile device 200 may be a smart terminal device, a tablet computer (Tablet PC), a mobile phone and other devices which have capabilities for connecting to the network, and other capabilities for being connected to the internet online store to download applications (App).

Figure 2:
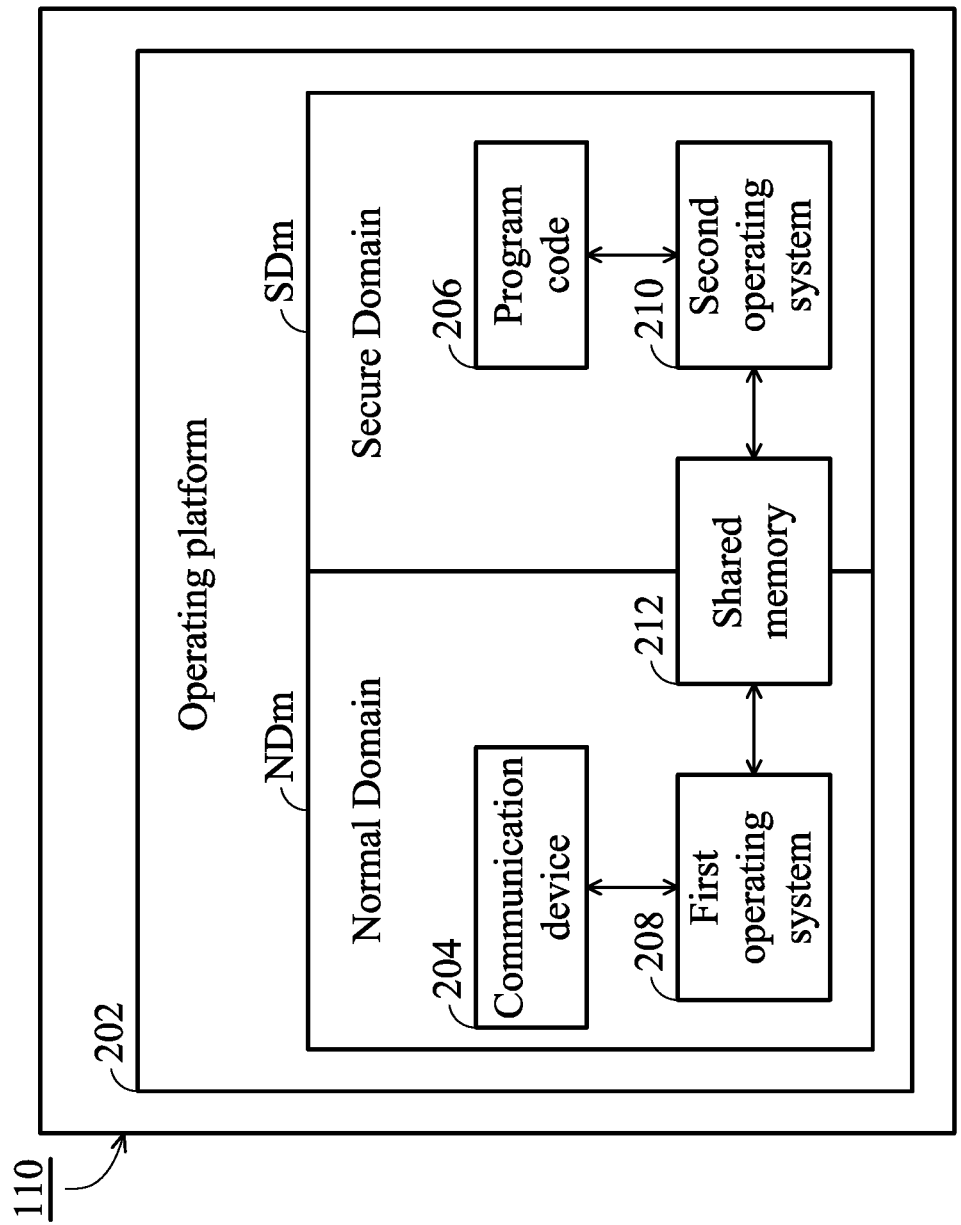
FIG. 2 shows an alternative simplified functional block diagram of the data encryption and decryption device according to one embodiment of the present invention.

FIG. 2 shows an alternative simplified functional block diagram of the data encryption and decryption device 110 according to one embodiment of the present invention. As shown in FIG. 2, an operating platform 202 runs on the data encryption and decryption device 110. For example, the operating platform 202 can be a kernel system running on the data encryption and decryption device 110. In this embodiment, the operating platform 202 has two domains, which are a normal domain NDm and a secured domain SDm. The normal domain NDm and the secured domain SDm exist concurrently on the operating platform 202 of the data encryption and decryption device 110.

There are two operating systems (OS) running on the operating platform 202 of the data encryption and decryption device 110. One of them is a first operating system 208 running within the normal domain NDm. The first operating system 208 is capable of accessing data under the normal domain NDm and denied from accessing data under the secured domain SDm. The other one is a second operating system 210 running within a secured domain. The second operating system 210 is capable of accessing data under both of the normal domain NDm and the secured domain SDm. In one embodiment of the invention, the first operating system can be Android, Windows, Symbian, iOS or any kind of mobile operating system.

In practical applications, the secured domain SDm can be realized with a TrustZone technology developed by ARM company, but the invention is not limited thereto. In embodiments of the invention, the secure domain SDm is generally invisible to the user from the normal domain NDm and cannot be accessed without proper authorization.

In this embodiment, the first operating system 208 can interchange data with the cloud device 120 and the mobile device 200 via a communication device 204 of the data encryption and decryption device 110. In addition, the first operating system 208 can be a general operating system in charge of most basic functions on the data encryption and decryption device 110 (e.g., multimedia playing, system maintaining, user interacting, etc.) The normal domain NDm is a public and unprotected domain, which is can be accessed freely and directly by users or applications on the first operating system 208.

The second operating system 210 is mainly in charge of functions for key generation and data encryption and decryption between the data encryption and decryption device 110, the cloud device 120 and the mobile device 200. In this embodiment, the second operating system 210 runs within the secured domain SDm. The secured domain SDm is a private and protected domain, which cannot be accessed nor observed directly by other applications. Generally, the first operating system 208 within the normal domain NDm has no accessibility to the secured domain SDm. After receiving a notification of data encryption and decryption from the cloud device 120 and the mobile device 200, the first operating system 208 can send a request (e.g., a special instruction set designed for communication with the second operating system 210) to trigger the second operating system 210 within the secured domain SDm and access data with the secure domain SDm through a shared memory 212. The shared memory 212 can be a memory space allocated by the kernel system (i.e., the operating platform 202). The shared memory 212 can be allocated in the system memory or other suitable memory device that can be accessed by both of the normal domain NDm and the secured domain SDm. For requests from different applications, the kernel system may allocate individual shared memory space with respect to each of them. The shared memory space can be implemented as a separate region within the memory and the data stored within can be flushed upon completion of corresponding application. Afterward, the second operating system 210 can take over the control of the following key generation, storage, replacement, and data encryption and decryption processes.

Figure 3A:
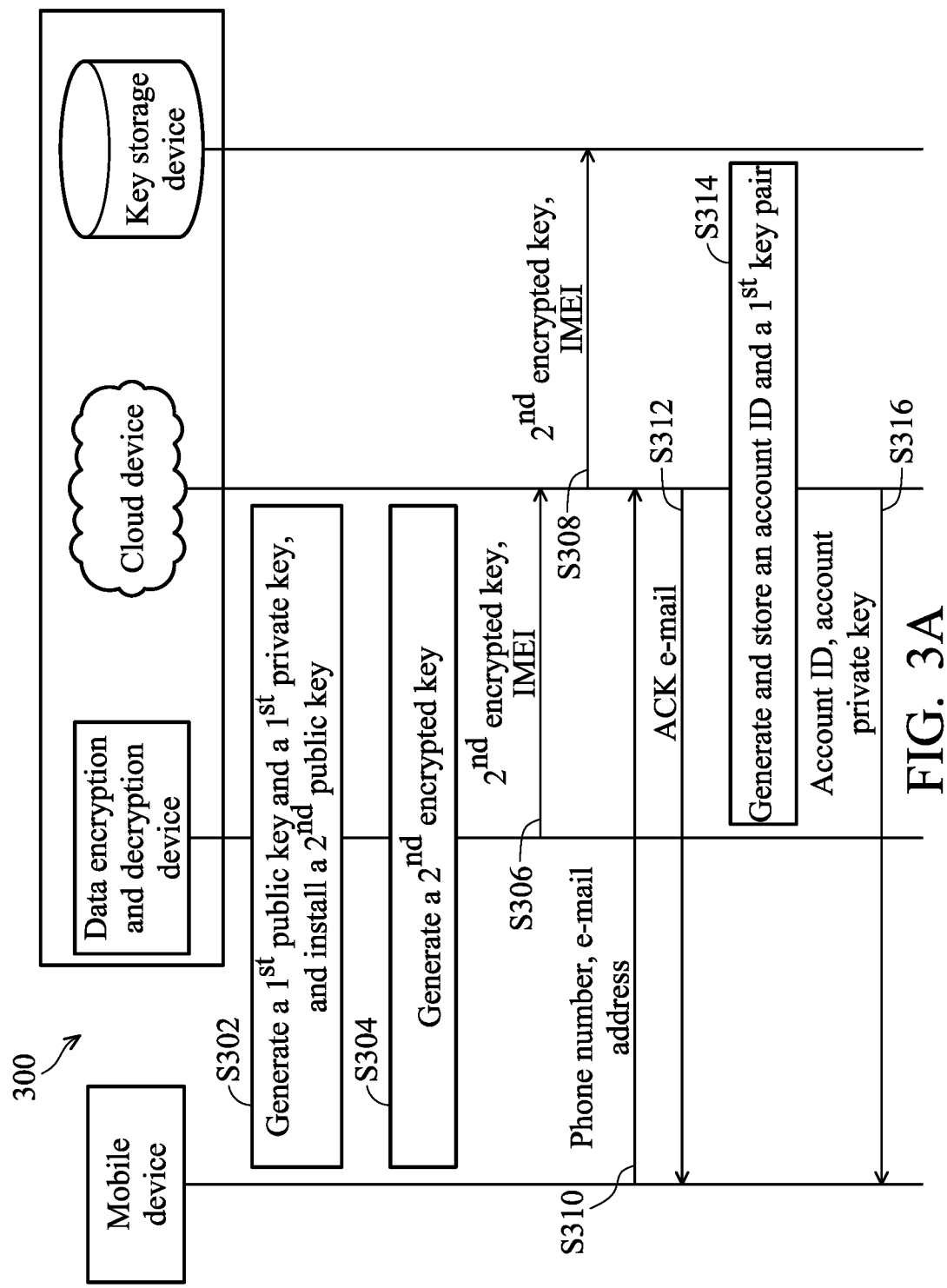
FIGS. 3A-3C are a message flow for performing a device matching process by the mobile device and the data encryption and decryption device according to an embodiment of the present invention.
Figure 3B:
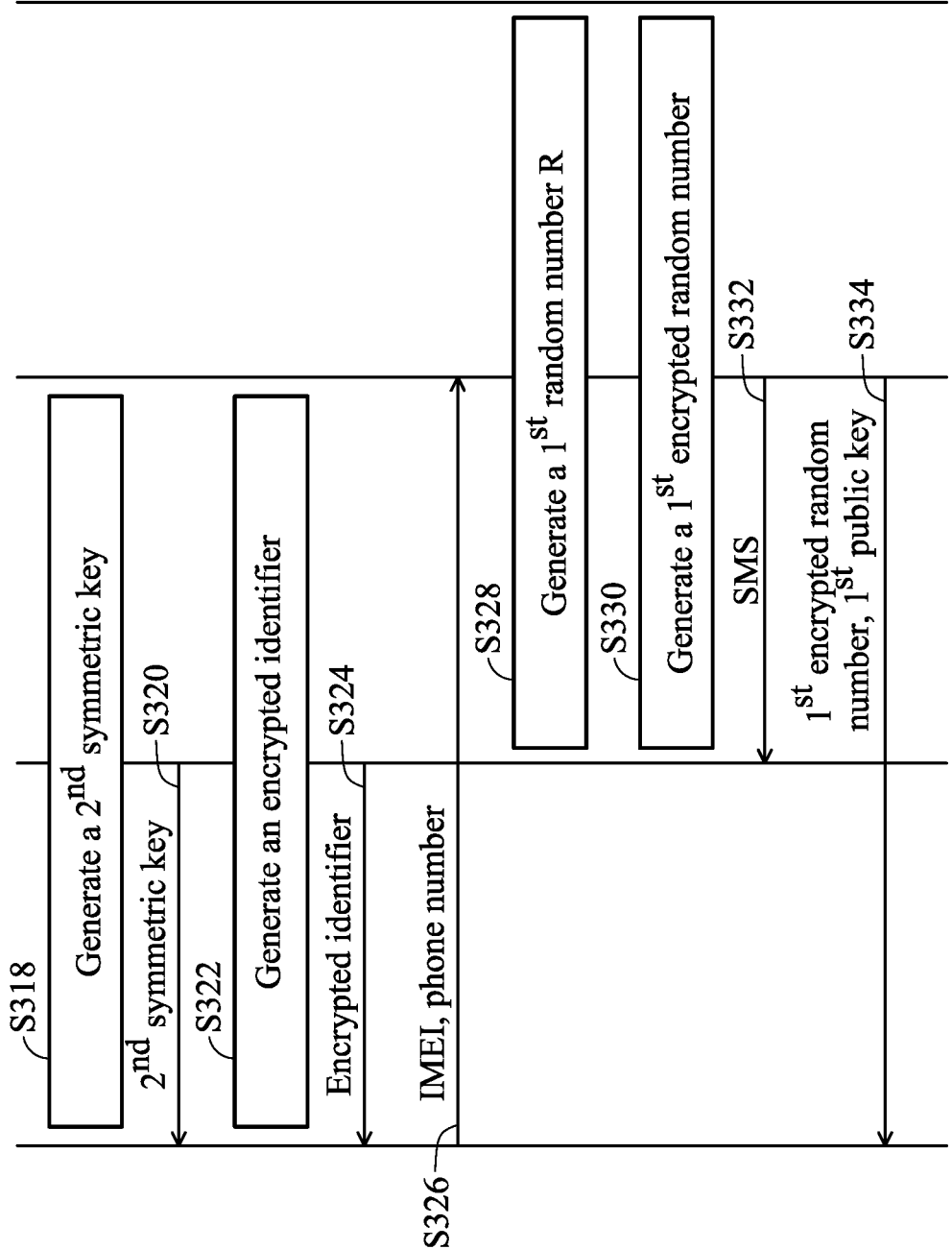
Figure 3C:
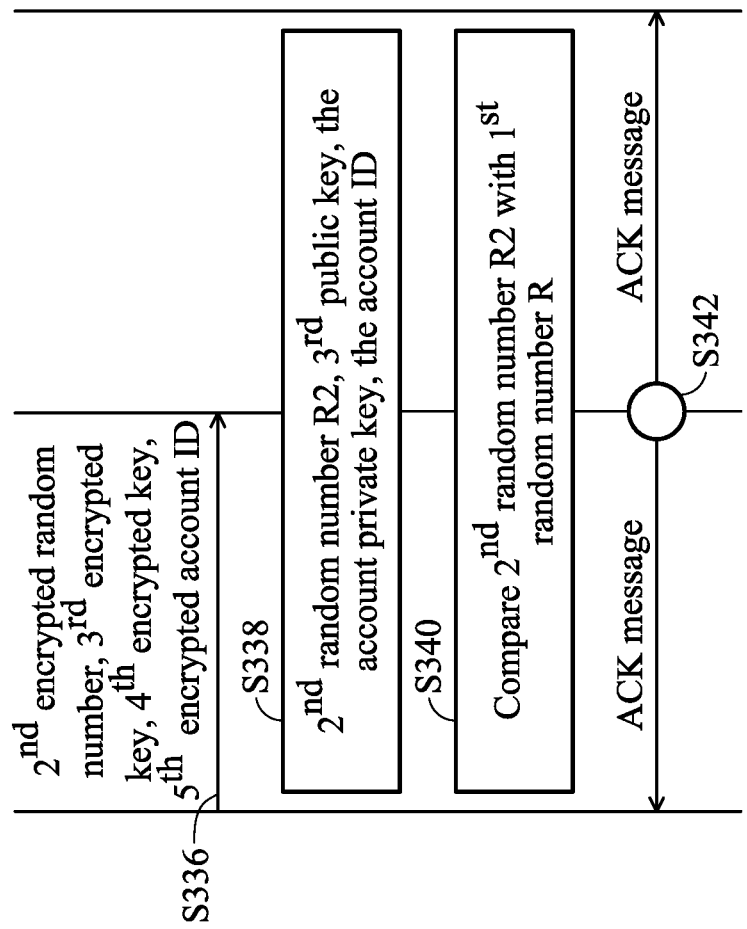

FIGS. 3A~3C are a message flow 300 for performing a device matching process by the mobile device and the data encryption and decryption device according to an embodiment of the present invention. It should be noted that before the process, the data encryption and decryption device may establish a first secure sockets layer (SSL) connection with the mobile device, and the cloud device may establish a second SSL connection with the mobile device.

In step S302, the data encryption and decryption device generates a first public key $K_{pub(casper)}$ and a first private key $K_{pri(casper)}$, and installs a second public key $K_{pub(KS)}$ generated by the key storage device in advance. In step S304, the data encryption and decryption device encrypt the first private key $K_{pri(casper)}$ using the second public key $K_{pub(KS)}$, and generates a second encrypted key $E\{K_{pri(casper)}, K_{pub(KS)}\}$. In step S306, the data encryption and decryption device transmits the second encrypted key $E\{K_{pri(casper)}, K_{pub(KS)}\}$ and an international mobile equipment identity (IMEI) corresponding to the data encryption and decryption device to the cloud device. The cloud device stores the second encrypted key $E\{K_{pri(casper)}, K_{pub(KS)}\}$ and the IMEI corresponding to the data encryption and decryption device. In step S308, the cloud device transmits the second encrypted key $E\{K_{pri(casper)}, K_{pub(KS)}\}$ and the IMEI corresponding to the data encryption and decryption device to the key storage device for storage.

Next, in step S310, the mobile device receives a phone number and an e-mail address transmitted from the mobile device. In step S312, the cloud device returns an acknowledgement (ACK) e-mail to the mobile device, wherein the acknowledgement e-mail comprises a uniform resource locator (URL). In step S314, the cloud device generates and stores an account ID and a first key pair ($K_{pub(account)}$, $K_{pri(account)}$) corresponding to the mobile device when the URL is clicked via the mobile device, wherein the first key pair comprises an account public key $K_{pub(account)}$ and an account private key $K_{pri(account)}$. In step S316, the cloud device transmits the account ID and the account private key $K_{pri(account)}$ to the mobile device through the second SSL connection. In another embodiment, the cloud device can return an acknowledgement short message including the URL to the mobile device through the phone number in step S312. When the URL in the acknowledgement short message is clicked, the cloud device can generate and store an account ID and a first key pair corresponding to the mobile device in step S314.

Next, in step S318, the data encryption and decryption device generates a second symmetric key $K_{temp}$. In step S320, the data encryption and decryption device transmits the second symmetric key $K_{temp}$ to the mobile device through Bluetooth pairing. In step S322, the data encryption and decryption device encrypts the IMEI using the second symmetric key $K_{temp}$, and generates an encrypted identifier AES{IMEI, $K_{temp}$}. In step S324, the data encryption and decryption device transmits the encrypted identifier AES{IMEI, $K_{temp}$} to the mobile device.

Then, in step S326, the cloud device receives the IMEI and the phone number transmitted from the mobile device. In step S328, the cloud device generates a first random number R. In step S330, the cloud device encrypts the first random number using the first public key $K_{pub(casper)}$, and generates a first encrypted random number E{R, $K_{pub(casper)}$}. In step S332, the cloud device transmits a short message service (SMS) to the data encryption and decryption device, wherein the SMS comprises the first encrypted random number E{R, $K_{pub(casper)}$}. In step S334, the cloud device transmits the first encrypted random number E{R, $K_{pub(casper)}$} and the first public key $K_{pub(casper)}$ to the mobile device through the second SSL connection.

In step S336, the data encryption and decryption device receives a second encrypted random number E{R2, $K_{pub(casper)}$}, a third encrypted key E{$K_{pub(master)}$, $K_{pub(casper)}$}, a fourth encrypted key E{$K_{pri(account)}$, $K_{pub(casper)}$} and a fifth encrypted account ID E{AccoundID, $K_{pub(casper)}$}, wherein the mobile device first generates a second key pair ($K_{pub(master)}$, $K_{pri(master)}$) (not shown in FIGS. 3A-3C); the second encrypted random number is generated by encrypting the second random number R2 using the first public key $K_{pub(casper)}$); the third encrypted key is generated by encrypting a third public key $K_{pub(master)}$ of the second key pair using the first public key $K_{pub(casper)}$); the fourth encrypted key is generated by encrypting the account private key $K_{pri(account)}$ using the first public key $K_{pub(casper)}$); and the fifth encrypted account ID is generated by encrypting the account ID by the first public key $K_{pub(casper)}$).

In step S338, the data encryption and decryption device decrypts the second encrypted random number E{R2, $K_{pub(casper)}$}, the third encrypted key E{$K_{pub(master)}$, $K_{pub(casper)}$}, the fourth encrypted key E{$K_{pri(account)}$, $K_{pub(casper)}$} and the fifth encrypted account ID using a first private key $K_{pri(casper)}$ and obtains the second random number R2, the third public key $K_{pub(master)}$, the account private key $K_{pri(account)}$ and the account ID. Finally, in step S340, the data encryption and decryption device compares the second random number R2 with the first random number R. When the second random number R2 and the first random number R are the same, in step S342, the data encryption and decryption device stores the third public key K pub(master), the account private key $K_{pri(account)}$ and the account ID, and transmits an acknowledgement (ACK) message to the cloud device and the mobile device, and the matching process is completed.

Figure 4:
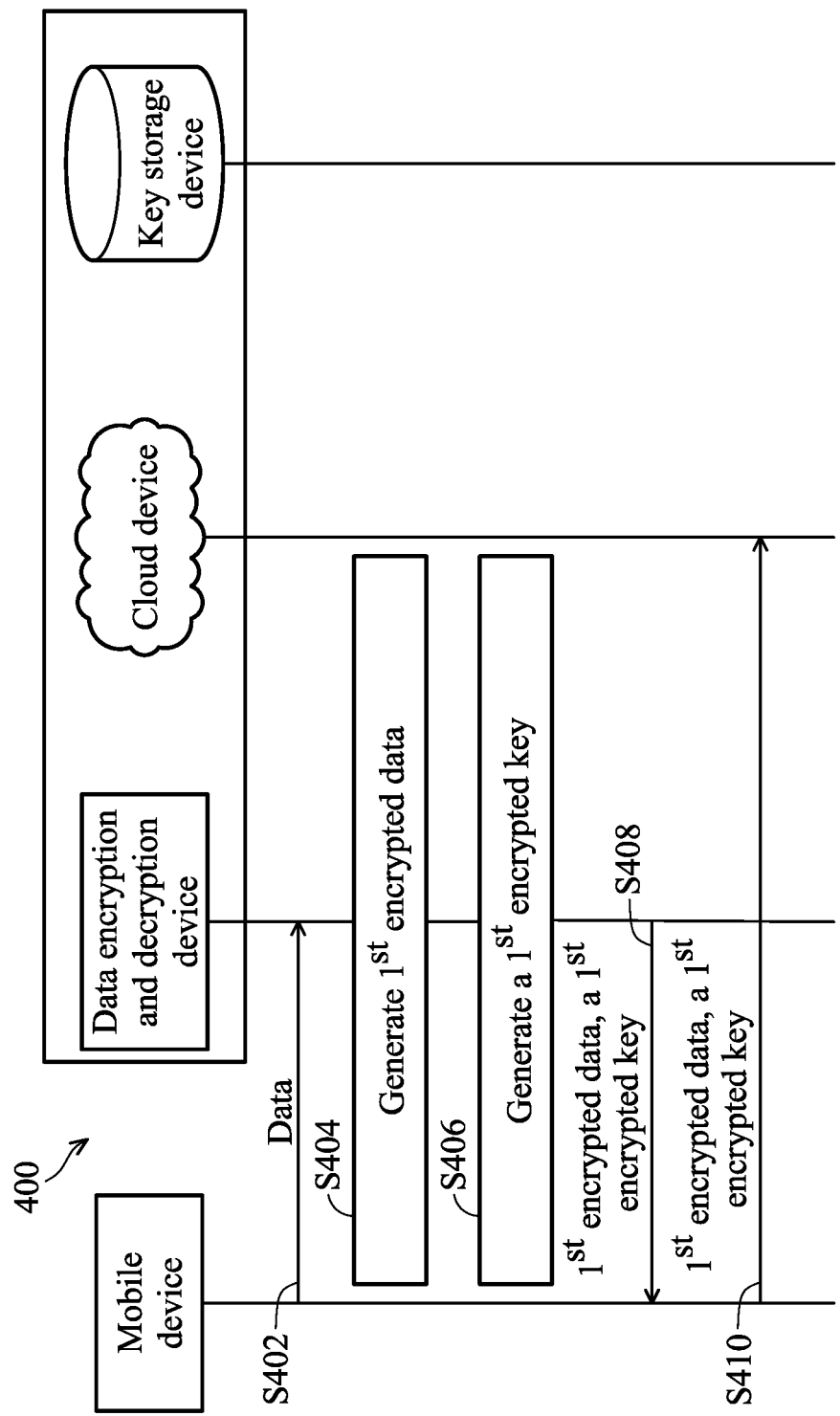
FIG. 4 is a message flow illustrating that the data encryption and decryption system encrypts the data according to an embodiment of the present invention.

FIG. 4 is a message flow 400 illustrating that the data encryption and decryption system encrypts the data according to an embodiment of the present invention with reference to FIGS. 3A-3C. It should be noted that before the process, the data encryption and decryption device may establish a first SSL connection with the mobile device, and the cloud device may establish a second SSL connection with the mobile device.

In step S402, the data encryption and decryption device receives data X transmitted from the mobile device, wherein the data X is the data that the user wants to encrypt. In step S404, the data encryption and decryption device generates a first symmetric key $K_i$, and encrypts the data X using the first symmetric key $K_i$, and generates first encrypted data AES{X, $K_i$}. Next, in step S406, the data encryption and decryption device encrypts the first symmetric key $K_i$ using the first public key $K_{pub(casper)}$ generated in FIGS. 3A~3C, and generates a first encrypted key E{$K_i$, $K_{pub(casper)}$}. Next, in step S408, the data encryption and decryption device transmits the first encrypted data AES{X, $K_i$} and the first encrypted key E{$K_i$, $K_{pub(casper)}$} to the mobile device to complete the process of data encryption. In another embodiment, the data encryption and decryption device can directly transmit the first encrypted data AES{X, $K_i$} and the first encrypted key E{$K_i$, $K_{pub(casper)}$} to the cloud device for storage.

In another embodiment, after the mobile device receives the first encrypted data AES{X, $K_i$} and the first encrypted key E{$K_i$, $K_{pub(casper)}$} transmitted from the data encryption and decryption device, in step S410, the mobile device uploads the first encrypted data AES{X, $K_i$} and the first encrypted key E{$K_i$, $K_{pub(casper)}$} to the cloud device for storage to avoid occupying the storage capacity of the mobile device. In another embodiment, the data encryption and decryption device can directly transmit the first encrypted data AES{X, $K_i$} and the first encrypted key E{$K_i$, $K_{pub(casper)}$} to the cloud device for storage to backup the data securely.

Figure 5:
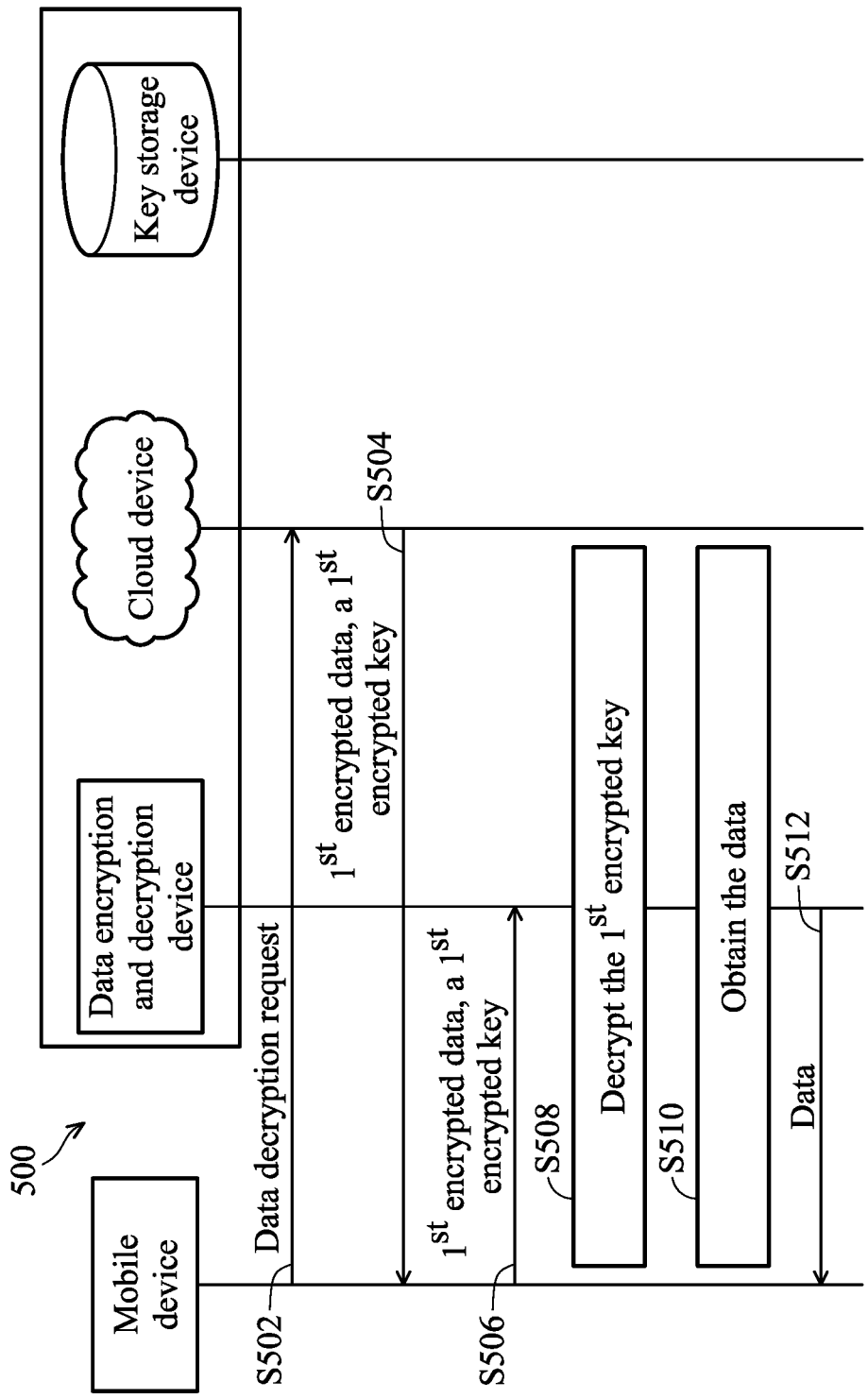
FIG. 5 is a message flow illustrating that the data encryption and decryption system decrypts the data according to an embodiment of the present invention.

FIG. 5 is a message flow 500 illustrating that the data encryption and decryption system decrypts the data according to an embodiment of the present invention with reference to FIGS. 3A-4. It should be noted that before the process, the data encryption and decryption device may establish a first SSL connection with the mobile device, and the cloud device may establish a second SSL connection with the mobile device. In one embodiment, the data encryption and decryption device can establish the SSL connection with the mobile device through Bluetooth transmission.

First, in step S502, the mobile device can transmit a data decryption request to the cloud device to request the data X of FIG. 4. In step S504, the cloud device transmits the first encrypted data AES{X, $K_i$} and the first encrypted key E{$K_i$, $K_{pub(casper)}$} to the mobile device according to the data decryption request. In step S506, the data encryption and decryption device receives the first encrypted data AES{X, $K_i$} and the first encrypted key E{$K_i$, $K_{pub(casper)}$} transmitted by the mobile device. In step S508, the data encryption and decryption device decrypts the first encrypted key E{K $K_{pub(casper)}$} using a first private key $K_{pub(casper)}$ generated from FIGS. 3A-3C to obtain the first symmetric key K In step S510, the data encryption and decryption device decrypts the first encrypted data AES{X, $K_i$} using a first symmetric key $K_i$ to obtain the data X. In step S512, the data encryption and decryption device transmits the data X to the mobile device, and the flow of data decryption is completed.

In another embodiment, before the data encryption and decryption device obtains the first symmetric key $K_i$ using a first private key $K_{pub(casper)}$ to decrypt the first encrypted key E{$K_i$, $K_{pub(casper)}$}, the data encryption and decryption device may perform an authentication procedure for an user. Examples of the authentication procedure include, but are not limited to, a fingerprint authentication procedure, a biometric authentication procedure, and so on.

Figure 6A:
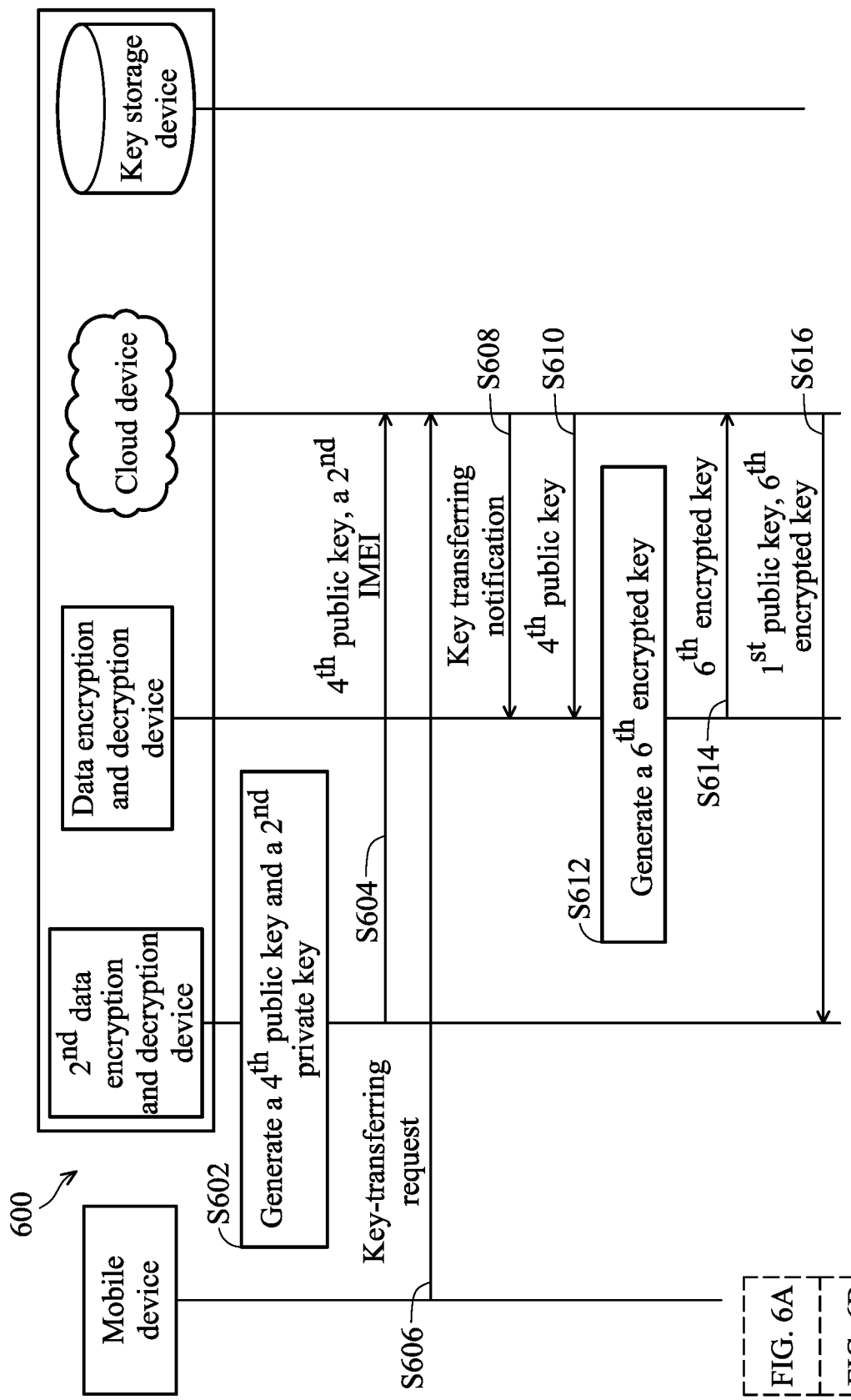
FIGS. 6A-6B are a message flow illustrating that the data encryption and decryption system performs a key transferring process according to an embodiment of the present invention.
Figure 6B:
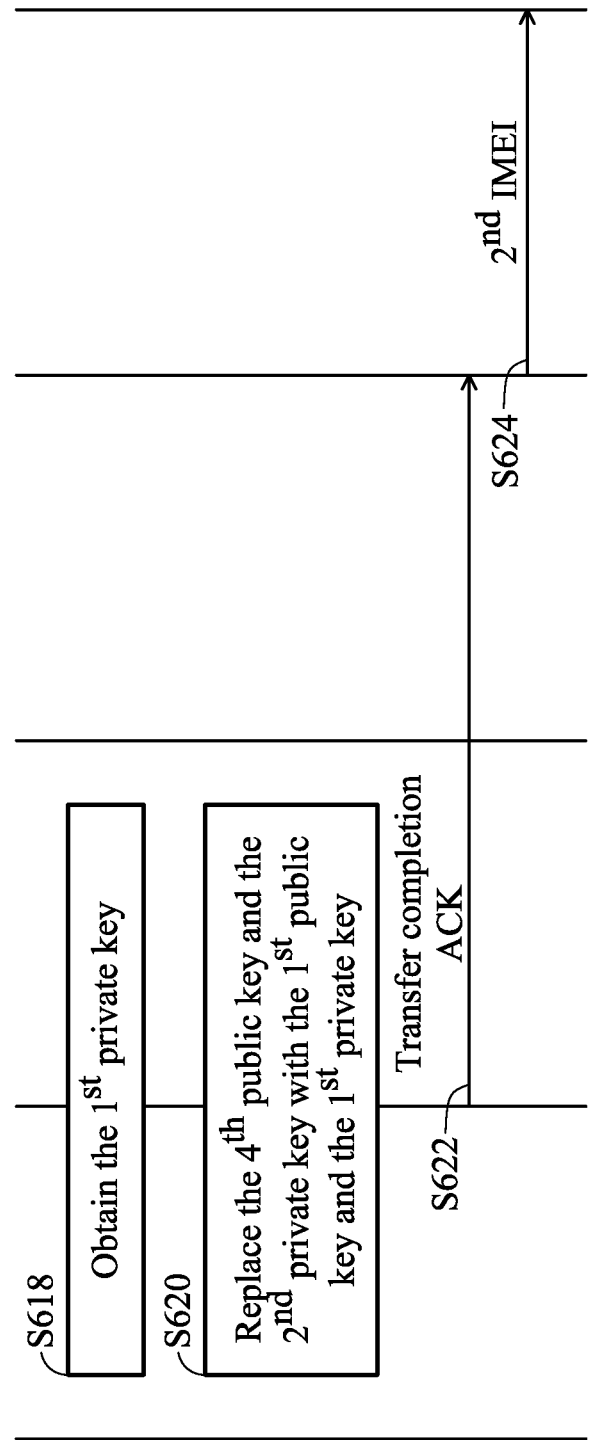

When a user wants to replace the original data encryption and decryption device and uses a second data encryption and decryption device (i.e., a new data encryption and decryption device), the data encryption and decryption system can be triggered to perform a transfer process via the mobile device. As shown in FIGS. 6A-6B, FIGS. 6A-6B are a message flow 600 illustrating that the data encryption and decryption system performs a key transferring process according to an embodiment of the present invention with reference to FIGS. 3A~5.

In one embodiment, before the process of FIGS. 6A~6B is performed, the mobile device must use the correct account ID to connect to the cloud device and the data encryption and decryption device first, and it then triggers the key transferring process via a key-transferring request. In step S602, the second data encryption and decryption device generates a fourth public key $K_{pub(casper')}$ and a second private key $K_{pri(casper')}$. In step S604, the second data encryption and decryption device uploads the fourth public key $K_{pub(casper')}$ and a second IMEI corresponding to the second data encryption and decryption device to the cloud device. In step S606, the cloud device receives a key-transferring request from the mobile device. In step S608, the cloud device transmits a key transferring notification to the data encryption and decryption device. In step S610, the data encryption and decryption device downloads the fourth public key $K_{pub(casper')}$ from the cloud device. In step S612, the data encryption and decryption device encrypts the first private key $K_{pri(casper)}$ using the fourth public key $K_{pub(casper')}$, and generates a sixth encrypted key $E\{K_{pri(casper)}, K_{pub(casper')}\}$. In step S614, the data encryption and decryption device transmits the sixth encrypted key $E\{K_{pri(casper)}, K_{pub(casper')}\}$ to the cloud device. After receiving the sixth encrypted key $E\{K_{pri(casper)}, K_{pub(casper')}\}$ in step S616, the cloud device transmits the first public key $K_{pub(casper)}$ and the sixth encrypted key $E\{K_{pri(casper)}, K_{pub(casper')}\}$ to the second data encryption and decryption device. In step S618, the second data encryption and decryption device decrypts the sixth encrypted key $E\{K_{pri(casper)}, K_{pub(casper')}\}$ using the second private key $K_{pri(casper')}$ to obtain the first private key $K_{pri(casper)}$. In step S620, the second data encryption and decryption device replaces the fourth public key $K_{pub(casper')}$ and the second private key $K_{pri(casper')}$ with the first public key $K_{pub(casper)}$ and the first private key $K_{pri(casper)}$, respectively. In step S622, the second data encryption and decryption device transmits a transfer completion acknowledgement (ACK) to the cloud device, and the key transferring process is completed.

In another embodiment, after receiving the transfer completion acknowledgement transmitted from the second data encryption and decryption device, the cloud device can bind the first public key $K_{pub(casper)}$ into the second IMEI corresponding to the second data encryption and decryption device (not shown in FIGS. 6A-6B). In step S624, the cloud device can transmit the second IMEI to the key storage device to replace the first IMEI.

Figure 7A:
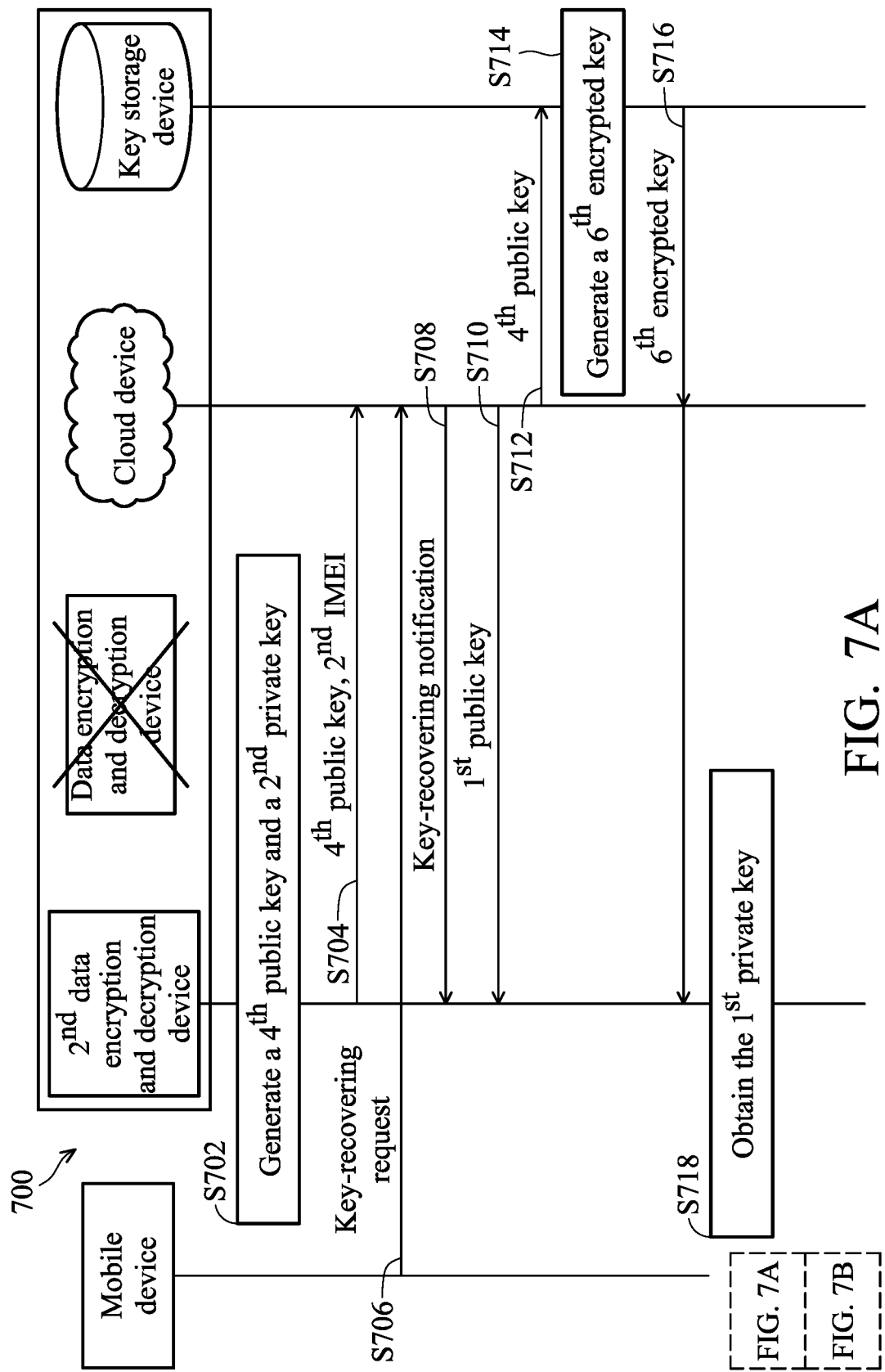
FIGS. 7A-7B are a message flow illustrating that the data encryption and decryption system performs a key-recovering process according to an embodiment of the present invention.
Figure 7B:
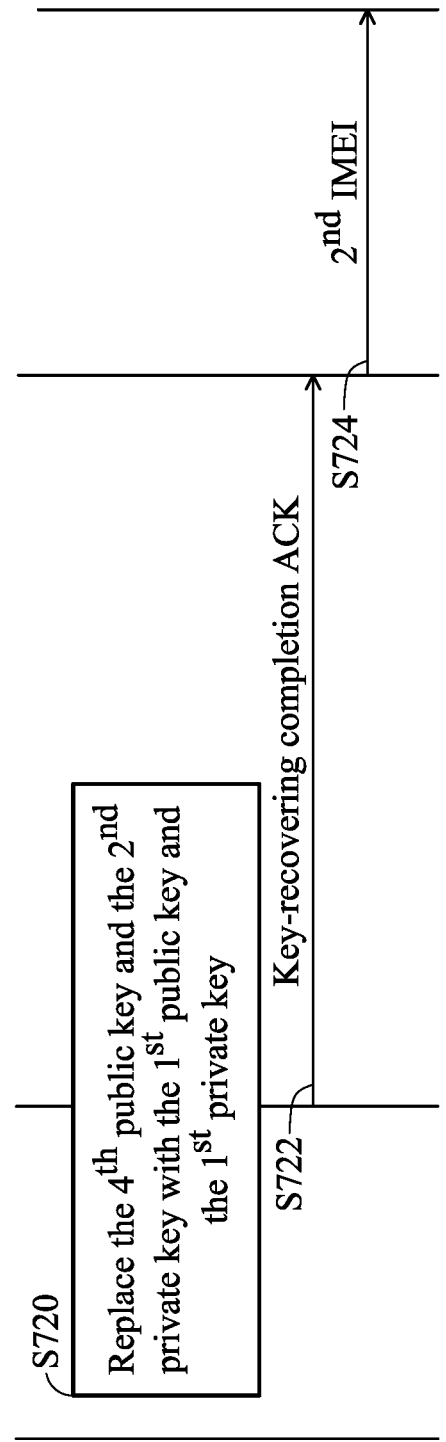

When a user loses the original data encryption and decryption device, the data encryption and decryption system can be triggered to perform a key-recovering process by the mobile device via a second data encryption and decryption device (i.e., a new data encryption and decryption device). As shown in FIGS. 7A-7B, FIGS. 7A-7B are a message flow 700 illustrating that the data encryption and decryption system performs a key-recovering process according to an embodiment of the present invention with reference to FIGS. 3A-6B.

In one embodiment, before the process of FIGS. 7A-7B is performed, the mobile device must use the correct account ID to connect to the cloud device and the data encryption and decryption device first, and then triggers the key-recovering process via a key-recovering request. In step S702, the second data encryption and decryption device generates a fourth public key $K_{pub(casper')}$ and a second private key $K_{pri(casper')}$. In step S704, the second data encryption and decryption device uploads the fourth public key $K_{pub(casper')}$ and a second IMEI corresponding to the second data encryption and decryption device to the cloud device. In step S706, the cloud device receives a key-recovering request from the mobile device. In step S708, the cloud device transmits a key-recovering notification to the second data encryption and decryption device. In step S710, the second data encryption and decryption device downloads the first public key $K_{pub(casper)}$ from the cloud device after receiving the key-recovering notification.

In step S712, the cloud device transmits the fourth public key $K_{pub(casper)}$ to the key storage device for storage. In step S714, the key storage device decrypts the second encrypted key $E\{K_{pri(casper)}, K_{pub(KS)}\}$ using a third private key $K_{pri(KS)}$ generated by itself to obtain the first private key $K_{pri(casper)}$, and encrypts the first private encrypted key $K_{pri(casper)}$ using the fourth public key $K_{pub(casper')}$ to generate a sixth encrypted key $E\{K_{pri(casper)}, K_{pub(casper')}\}$. In step S716, the second data encryption and decryption device receives the sixth encrypted key $E\{K_{pri(casper)}, K_{pub(casper')}\}$ transmitted from the key storage device through the cloud device. In step S718, the second data encryption and decryption device decrypts the sixth encrypted key $E\{K_{pri(casper)}, K_{pub(casper')}\}$ using the second private key $K_{pri(casper')}$ to obtain the first private key $K_{pri(casper)}$. In step S720, the second data encryption and decryption device replaces the fourth public key $K_{pub(casper')}$ and the second private key $K_{pri(casper')}$ with the first public key $K_{pub(casper)}$ and the first private key $K_{pri(casper)}$, respectively. In step S722, the second data encryption and decryption device transmits a key-recovering completion acknowledgement (ACK) to the cloud device, and the key-recovering process is completed.

In another embodiment, after receiving the key-recovering completion acknowledgement transmitted from the second data encryption and decryption device, the cloud device can bind the first public key $K_{pub(casper)}$ into the second IMEI corresponding to the second data encryption and decryption device (not shown in FIGS. 7A-7B). In step S724, the cloud device can transmit the second IMEI to the key storage device to replace the first IMEI.

Figure 8:
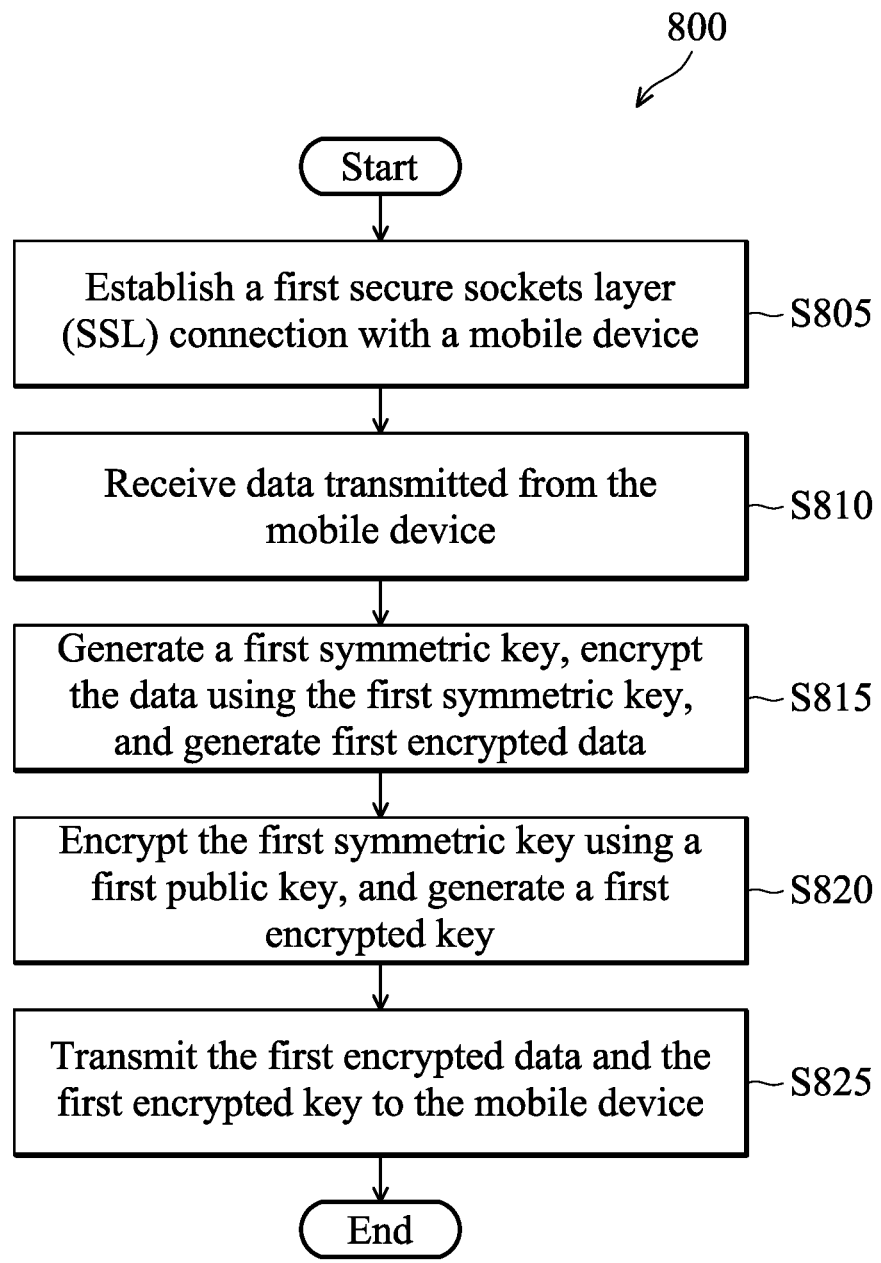
FIG. 8 is a flow diagram illustrating a data encryption method according to an embodiment of the present invention.

FIG. 8 is a flow diagram 800 illustrating a data encryption method according to an embodiment of the present invention. The method is used in a data encryption and decryption system. In step S805, a data encryption and decryption device establishes a first secure sockets layer (SSL) connection with a mobile device. In step S810, the data encryption and decryption device receives data X transmitted from the mobile device. In step S815, the data encryption and decryption device generates a first symmetric key $K_i$, encrypts the data using the first symmetric key $K_i$, and generates first encrypted data $AES\{X, K_i\}$. In step S820, the data encryption and decryption device encrypts the first symmetric key $K_i$ using a first public key $K_{pub(casper)}$, and generates a first encrypted key $E\{K_i, K_{pub(casper)}\}$. Finally, in step S825, the data encryption and decryption device transmits the first encrypted data AES{X, $K_i$} and the first encrypted key E{$K_i$, $K_{pub(casper)}$} to the mobile device.

Figure 9:
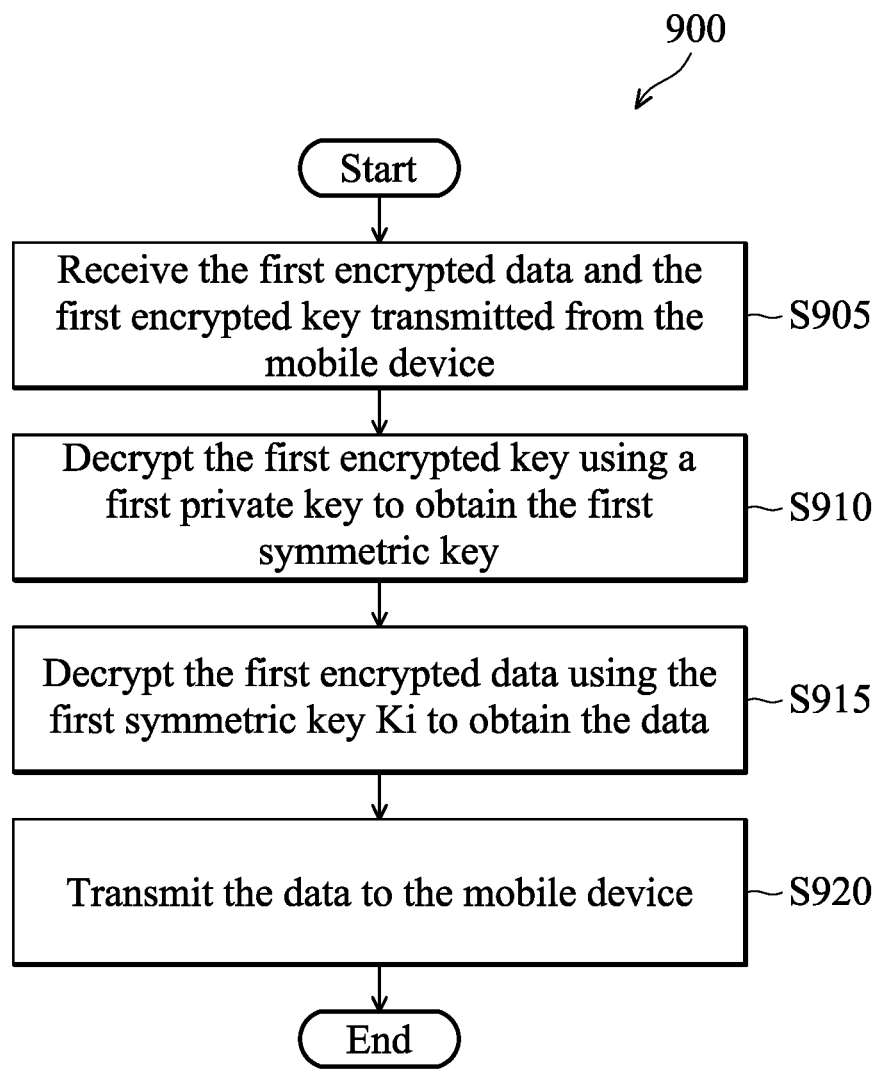
FIG. 9 is a flow diagram illustrating a data decryption method according to an embodiment of the present invention.

FIG. 9 is a flow diagram 900 illustrating a data decryption method according to an embodiment of the present invention. The method is used in a data encryption and decryption system. In step S905, a data encryption and decryption device receives the first encrypted data AES{X, $K_i$} and the first encrypted key E{$K_i$, $K_{pub(casper)}$} transmitted from the mobile device. In step S910, the data encryption and decryption device decrypts the first encrypted key E{$K_i$, $K_{pub(casper)}$} using a first private key $K_{pri(casper)}$ to obtain the first symmetric key $K_1$. In step S915, the data encryption and decryption device decrypts the first encrypted data AES{X, $K_i$} using the first symmetric key $K_i$ to obtain the data X. In step S920, the data encryption and decryption device transmits the data X to the mobile device.

Therefore, the data encryption and decryption method and system can encrypt and decrypt the data of the mobile device using the hardware protection mechanism of the data encryption and decryption device.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of exemplary embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data encryption and decryption method, used in a data encryption and decryption system, comprising:
    establishing, by a data encryption and decryption device, a first secure sockets layer (SSL) connection with a mobile device;
    receiving data transmitted from the mobile device;
    generating a first symmetric key, encrypting the data using the first symmetric key, and generating first encrypted data;
    encrypting the first symmetric key using a first public key, and generating a first encrypted key; and
    transmitting the first encrypted data and the first encrypted key to the mobile device,
    wherein the method further comprising:
        receiving, by the data encryption and decryption device, the first encrypted data and the first encrypted key transmitted from the mobile device;
        decrypting the first encrypted key using a first private key to obtain the first symmetric key;
        decrypting the first encrypted data using the first symmetric key to obtain the data; and
        transmitting the data to the mobile device.

2. The data encryption and decryption method as claimed in claim 1, after the mobile device receives the first encrypted data and the first encrypted key, the mobile device uploads the first encrypted data and the first encrypted key to a cloud device.

3. The data encryption and decryption method as claimed in claim 1, wherein before decrypting the first symmetric key using the first private key, the method further comprises:
performing, by the data encryption and decryption device, an authentication process,
wherein the authentication process is a fingerprint authentication process.

4. The data encryption and decryption method as claimed in claim 1, wherein the data encryption and decryption device establishes the first SSL connection with the mobile device through Bluetooth transmission.

5. The data encryption and decryption method as claimed in claim 1, wherein before establishing the first SSL connection with the mobile device, the method further comprises:
performing a device matching process,
wherein the device matching process comprises:
installing, by the data encryption and decryption device, a second public key generated by a key storage device in advance;
generating the first public key and the first private key;
using the second public key to encrypt the first private key, and generating a second encrypted key; and
transmitting the second encrypted key and an international mobile equipment identity (IMEI) corresponding to the data encryption and decryption device to a cloud device, and storing the second encrypted key and the IMEI into the cloud device; the cloud device transmits the second encrypted key and the IMEI to the key storage device.

6. The data encryption and decryption method as claimed in claim 5, wherein the device matching process further comprises:
establishing, by the cloud device, a second SSL connection with the mobile device;
receiving, by the cloud device, a phone number and an e-mail address transmitted from the mobile device, and returning an acknowledgement e-mail to the mobile device, wherein the acknowledgement e-mail comprises an uniform resource locator (URL);
generating, by the cloud device, and storing an account ID and a first key pair corresponding to the mobile device when the URL is clicked via the mobile device, wherein the first key pair comprises an account public key and an account private key; and
transmitting the account ID and the account private key to the mobile device through the second SSL connection.

7. The data encryption and decryption method as claimed in claim 6, wherein the device matching process further comprises:
generating, by the data encryption and decryption device, a second symmetric key, and transmitting the second symmetric key to the mobile device through Bluetooth pairing;
encrypting the IMEI using the second symmetric key, and generating an encrypted identifier; and
transmitting the encrypted identifier to the mobile device.

8. The data encryption and decryption method as claimed in claim 7, wherein the device matching process further comprises:
receiving, by the cloud device, the IMEI, and the phone number transmitted from the mobile device;
generating a first random number;
encrypting the first random number using the first public key, and generating a first encrypted random number;
transmitting a short message service (SMS) to the data encryption and decryption device, wherein the SMS comprises the first encrypted random number; and
transmitting the first encrypted random number and the first public key to the mobile device through the second SSL connection.

9. The data encryption and decryption method as claimed in claim 8, wherein the device matching process further comprises:
receiving, by the data encryption and decryption device, a second encrypted random number, a third encrypted key, a fourth encrypted key and a fifth encrypted key, wherein the mobile device generates a second key pair; the second encrypted random number is generated by encrypting a second random number using the first public key; the third encrypted key is generated by encrypting a third public key of the second key pair using the first public key; the fourth encrypted key is generated by encrypting the account private key using the first public key; and the fifth encrypted key is generated by encrypting the account ID by the first public key.

10. The data encryption and decryption method as claimed in claim 9, wherein the device matching process further comprises:
decrypting, by the data encryption and decryption device, the second encrypted random number, the third encrypted key, the fourth encrypted key and the fifth encrypted key using a first private key and obtaining the second random number, the third public key, the account private key and the account ID; and
comparing the second random number with the first random number, wherein when the second random number and the first random number are the same, the data encryption and decryption device stores the third public key, the account private key and the account ID, and transmits an acknowledgement message to the cloud device and the mobile device, and the device matching process is completed.

11. The data encryption and decryption method as claimed in claim 9, the method further comprising:
generating, by a second data encryption and decryption device, a fourth public key and a second private key, and uploading the fourth public key and a second IMEI corresponding to the second data encryption and decryption device to a cloud device;
receiving, by the cloud device, a key-transferring request from the mobile device;
transmitting, by the cloud device, a key transferring notification to the data encryption and decryption device;
downloading, by the second data encryption and decryption device, the fourth public key from the cloud device after receiving the key transferring notification;
encrypting, by the data encryption and decryption device, the first private key using the fourth public key, generating a sixth encrypted key, and transmitting the sixth encrypted key to the cloud device;

transmitting, by the cloud device, the first public key and the sixth encrypted key to the second data encryption and decryption device;

decrypting, by the second data encryption and decryption device, the sixth encrypted key using the second private key to obtain the first private key, replacing the fourth public key and the second private key with the first public key and the first private key; and transmitting, by the second data encryption and decryption device, a transfer completion acknowledgement to the cloud device.

12. The data encryption and decryption method as claimed in claim 11, the method further comprising:

binding, by the cloud device, the first public key into the second IMEI corresponding to the second data encryption and decryption device after receiving the transfer completion acknowledgement.

13. The data encryption and decryption method as claimed in claim 9, the method further comprising:

generating, by a second data encryption and decryption device, a fourth public key and a second private key, and uploading the fourth public key and a second IMEI corresponding to the second data encryption and decryption device to the cloud device;

receiving, by the cloud device, a key-recovering request from the mobile device;

transmitting, by the cloud device, a key-recovering notification to the second data encryption and decryption device;

downloading, by the second data encryption and decryption device, the first public key from the cloud device after receiving the key-recovering notification;

receiving, by the second data encryption and decryption device, a sixth encrypted key transmitted from the key storage device, and decrypting the sixth encrypted key using the second private key to obtain the first private key;

replacing, by the second data encryption and decryption device, the fourth public key and the second private key with the first public key and the first private key; and transmitting, by the second data encryption and decryption device, a key-recovering completion acknowledgement to the cloud device.

14. The data encryption and decryption method as claimed in claim 13, the method further comprising:

binding, by the cloud device, the first public key into the second IMEI after receiving the key-recovering completion acknowledgement.

15. The data encryption and decryption method as claimed in claim 13, wherein after the second data encryption and decryption device uploads the fourth public key and the second IMEI to the cloud device, the method further comprises:

transmitting, by the cloud device, the fourth public key to the key storage device; and decrypting, by the key storage device, the second encrypted key using a third private key to obtain the first private key, and encrypting the first private key using the fourth public key to generate the sixth encrypted key.

16. A data encryption and decryption system, comprising:
a cloud device; and
a data encryption and decryption device, coupled to the cloud device and used to:
establish a first secure sockets layer (SSL) connection with a mobile device;
receive data transmitted from the mobile device;
generate a first symmetric key, encrypt the data using the first symmetric key, and generate first encrypted data;
encrypt the first symmetric key using a first public key, and generate a first encrypted key; and
transmit the first encrypted data and the first encrypted key to the mobile device,
wherein the data encryption and decryption device further executes the following operations:
receiving the first encrypted data and the first encrypted key transmitted from the mobile device;
decrypting the first encrypted key using a first private key to obtain the first symmetric key;
decrypting the first encrypted data using the first symmetric key to obtain the data; and
transmitting the data to the mobile device.

17. The data encryption and decryption system as claimed in claim 16, wherein after the mobile device receives the first encrypted data and the first encrypted key, the mobile device uploads the first encrypted data and the first encrypted key to the cloud device.

18. The data encryption and decryption system as claimed in claim 16, wherein before decrypting the first symmetric key using the first private key, the data encryption and decryption device further executes the following operations:
performing an authentication process,
wherein the authentication process is a fingerprint authentication process.

19. The data encryption and decryption system as claimed in claim 16, wherein the data encryption and decryption device establishes the first SSL connection with the mobile device through Bluetooth transmission.

20. The data encryption and decryption system of data as claimed in claim 16, further comprising:
a key storage device, coupled to the cloud device;
wherein before the data encryption and decryption device establishes the first SSL connection with the mobile device, the data encryption and decryption device performs a device matching process,
wherein the device matching process comprises:
the data encryption and decryption device installs a second public key, the first public key and the first private key;
the data encryption and decryption device uses the second public key to encrypt the first private key, and generates a second encrypted key;
the data encryption and decryption device transmits the second encrypted key and an international mobile equipment identity (IMEI) corresponding to the data encryption and decryption device to the cloud device, and stores the second encrypted key and the IMEI into the cloud device; and
the cloud device transmits the second encrypted key and the IMEI to the key storage device.

21. The data encryption and decryption system as claimed in claim 20, wherein the device matching process further comprises:
the cloud device establishes a second SSL connection with the mobile device;
the cloud device receives a phone number and an e-mail address transmitted from the mobile device, and returns an acknowledgement e-mail to the mobile device, wherein the acknowledgement e-mail comprises an uniform resource locator (URL);

the cloud device generates and stores an account ID and a first key pair corresponding to the mobile device when the URL is clicked via the mobile device, wherein the first key pair comprises an account public key and an account private key; and the cloud device transmits the account ID and the account private key to the mobile device through the second SSL connection.

22. The data encryption and decryption system as claimed in claim 21, wherein the device matching process further comprises:

the data encryption and decryption device generates a second symmetric key and transmits the second symmetric key to the mobile device;

the data encryption and decryption device encrypts the IMEI using the second symmetric key and generates an encrypted identifier; and the data encryption and decryption device transmits the encrypted identifier to the mobile device.

23. The data encryption and decryption system as claimed in claim 22, wherein the device matching process further comprises:

the cloud device receives the phone number transmitted from the mobile device and the IMEI;

the cloud device generates a first random number;

the cloud device encrypts the first random number using the first public key and generates a first encrypted random number;

the cloud device transmits a short message service (SMS) to the data encryption and decryption device, wherein the SMS comprises the first encrypted random number; and the cloud device transmits the first encrypted random number and the first public key to the mobile device through the second SSL connection.

24. The data encryption and decryption system as claimed in claim 23, wherein the device matching process further comprises:

the data encryption and decryption device receives a second encrypted random number, a third encrypted key, a fourth encrypted key and a fifth encrypted key, wherein the mobile device generates a second key pair; the second encrypted random number is generated by encrypting a second random number using the first public key; the third encrypted key is generated by encrypting a third public key of the second key pair using the first public key; the fourth encrypted key is generated by encrypting the account private key using the first public key; and the fifth encrypted key is generated by encrypting the account ID by the first public key.

25. The data encryption and decryption system as claimed in claim 24, wherein the device matching process further comprising:

the data encryption and decryption device decrypts the second encrypted random number, the third encrypted key, the fourth encrypted key and the fifth encrypted key using a first private key and obtains the second random number, the third public key, the account private key and the account ID; and the data encryption and decryption device compares the second random number with the first random number, wherein when the second random number and the first random number are the same, the data encryption and decryption device stores the third public key, the account private key and the account ID, and transmits an acknowledgement message to the cloud device and the mobile device, and the device matching process is completed.

26. The data encryption and decryption system as claimed in claim 24, wherein the device matching process further comprises:

a second data encryption and decryption device generates a fourth public key and a second private key, and uploads the fourth public key and a second IMEI corresponding to the second data encryption and decryption device to the cloud device;

the cloud device receives a key-transferring request from the mobile device;

the cloud device transmits a key transferring notification to the data encryption and decryption device;

the data encryption and decryption device downloads the fourth public key from the cloud device after receiving the key transferring notification;

the data encryption and decryption device encrypts the first private key using the fourth public key, generates a sixth encrypted key and transmits the sixth encrypted key to the cloud device;

the cloud device transmits the first public key and the sixth encrypted key to the second data encryption and decryption device;

the second data encryption and decryption device decrypts the sixth encrypted key using the second private key to obtain the first private key, replaces the fourth public key and the second private key with the first public key and the first private key; and the second data encryption and decryption device transmits a transfer completion acknowledgement to the cloud device.

27. The data encryption and decryption system as claimed in claim 26, wherein the device matching process further comprises:

the cloud device binds the first public key into the second IMEI corresponding to the second data encryption and decryption device after receiving the transfer completion acknowledgement.

28. The data encryption and decryption system as claimed in claim 24, further comprising:

a second data encryption and decryption device generates a fourth public key and a second private key, and uploads the fourth public key and a second IMEI corresponding to the second data encryption and decryption device to the cloud device;

the cloud device receives a key-recovering request from the mobile device;

the cloud device transmits a key-recovering notification to the second data encryption and decryption device;

the second data encryption and decryption device downloads the first public key from the cloud device after receiving the key-recovering notification;

the second data encryption and decryption device receives a sixth encrypted key transmitted from the key storage device, and decrypts the sixth encrypted key using the second private key to obtain the first private key;

the second data encryption and decryption device replaces the fourth public key and the second private key with the first public key and the first private key; and the second data encryption and decryption device transmits a key-recovering completion acknowledgement to the cloud device.

29. The data encryption and decryption system as claimed in claim 28, further comprising:
   the cloud device binds the first public key into the second IMEI after receiving the key-recovering completion acknowledgement.

30. The data encryption and decryption system as claimed in claim 28, wherein after the second data encryption and decryption device uploads the fourth public key and the second IMEI to the cloud device, the cloud device and the key storage device further executes the following operations:
   the cloud device transmits the fourth public key to the key storage device; and
      the key storage device decrypts the second encrypted key using a third private key to obtain the first private key, and encrypts the first private key using the fourth public key to generate the sixth encrypted key.

* * * * *